3,506,519
METHOD OF MAKING INTERLOCKED WELDED CONNECTIONS BETWEEN THERMOPLASTIC ARTICLES
James J. Blumenkranz, Hollywood, Calif., assignor to The Susquehanna Corporation, a corporation of Delaware
Filed Jan. 13, 1967, Ser. No. 609,237
Int. Cl. B29c 27/02
U.S. Cl. 156—275                                   4 Claims

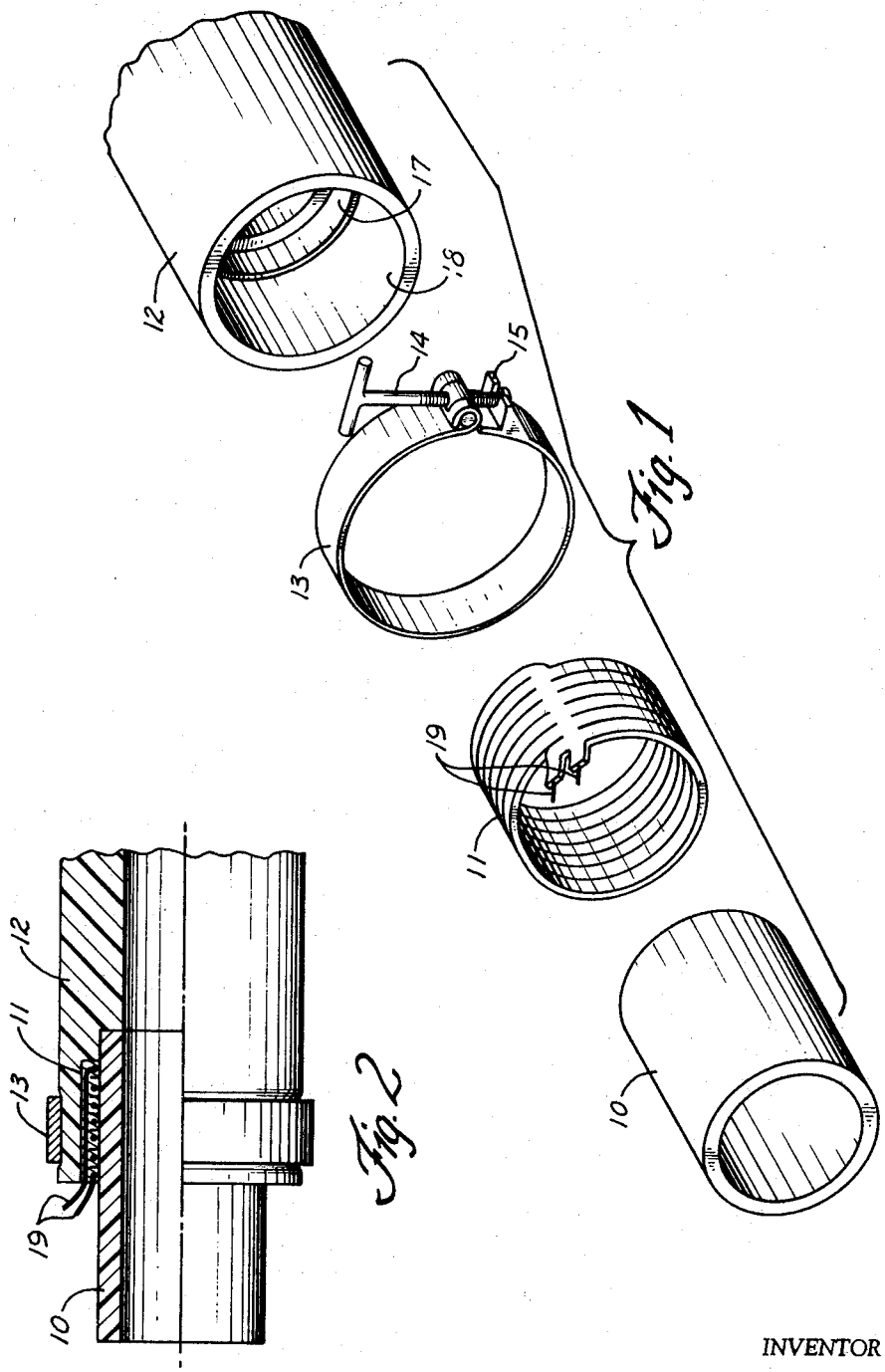
April 14, 1970　　J. J. BLUMENKRANZ　　3,506,519
METHOD OF MAKING INTERLOCKED WELDED CONNECTIONS BETWEEN
THERMOPLASTIC ARTICLES
Filed Jan. 13, 1967
INVENTOR
JAMES J. BLUMENKRANZ
BY
AGENT United States Patent Office 3,506,519
Patented Apr. 14, 1970

ABSTRACT OF THE DISCLOSURE

Interlocking thermoplastic articles are joined by electrical welding. A welding sleeve having electrical heating coils embedded therein is interposed between the interlocked articles. All three elements are then clamped together and current applied to the coil to effect the weld.

BACKGROUND OF THE INVENTION

This invention relates generally to the joining of interlocking thermoplastic articles and, more particularly, to a process for joining such articles by means of an electrical welding process.

Field

Thermoplastic polymers have become increasingly important as materials for constructing many types of articles, primary examples of which are pipes and pipe fittings. The ability to withstand corrosion, the ease of handling, the minimum weight and moldability of such materials make them extremely attractive for this use. Joining articles of thermoplastic polymers has been accomplished by conventional mechanical joining means such as threaded joints and flange connections, by chemical means such as solvent welding, and by thermal means such as flame or electrical resistance welding. In many applications mechanical joints are unacceptable due to their tendency not to be fluid-tight and because such assembly is time-consuming, expensive and cumbersome. Solvent welding requires some degree of care in applying the solvent to the surface of the articles to be joined and also requires immediate assembly of these articles since the solvent attacks the thermoplastic material immediately. Furthermore, some thermoplastic materials, for example, polypropylene, have relatively low solubility in conventional solvents used for welding and, therefore, to date, have been joined primarily by mechanical joining means or by thermal welding.

Prior art

One of the methods used for thermal welding of plastic pipes and pipe joints involves the use of a welding sleeve of the type described in U.S. Patent No. 3,094,452, Method of Making Interlocked Welded Connections Between Shaped Thermoplastic Articles of June 18, 1963, which includes an electrical resistance element consisting of a wire core connected by or embedded in a thin layer of thermoplastic resin. In accordance with the teachings of this patent, the sleeve is interposed between the two interlocked thermoplastic elements and upon the application of inductive or conductive electric current to the wire coil, the resultant heat causes the thin layer of resin in the coil and the surfaces of the adjacent parts of the shaped articles to be melted to thereby weld the parts together. Welded connections manufactured by this process seem to be perfect in theory, but in actuality there are several formidable problems which must be overcome. These problems are centered about the area of providing a fusion layer, that is, the layer of surface of each article which is melted, of sufficient depth to establish a strong weld. The depth of the fusion layer is directly related to the intimacy of contact of the articles and in most applications should be about .025 inch. A major factor affecting the degree of intimacy of contact is the formation of air bubbles, which preclude fusion, between the surfaces to be joined. As thermoplastic articles are heated they expand appreciably and when welding a plastic pipe to a plastic fitting, for example, the fitting will expand to such an extent as to allow air to become entrapped between it and the pipe, thus precluding intimacy of contact and causing an imperfect joint. A second problem is that of sizing, such being particularly evident in the joining of a tubular pipe to a fitting. If the exterior sizing of the pipe and the interior sizing of the fitting are not accurate and too much clearance exists at the outset of the joining process, the aforementioned air entrapment problem is compounded. Another problem is presented when this welding process is used in cold climates, for only a very thin surface layer of each of the interlocked articles is melted due to the great amount of heat lost to the cold articles, and the resulting fusion layer is so shallow that the joint is subject to failure under very low stresses.

SUMMARY OF THE INVENTION

The method recited by the instant invention is calculated to overcome the problems mentioned above without unduly complicating the processes set forth in the prior art. Briefly stated, the invention adds the step of applying external pressure to the articles being joined at predetermined times during the welding process so that the articles and the welding sleeve are held in intimate contact throughout the operation. This can be accomplished in the case of a tubular pipe and fitting, for example, by providing a tightening strap around the weld area. The addition of external pressure forces the articles into initial close contact, restrains the articles against thermal expansion, allows a certain amount of mismatch in size to be compensated for, and causes much more efficient heat transfer and thus insures optimum depth of fusion.

Accordingly, it is an object of this invention to provide an improved method for joining thermoplastic articles by electric welding.

Another object of this invention is to provide an improved method for joining thermoplastic pipe and fittings which compensates for inaccurate sizing of pipe and fitting.

THE DRAWINGS

FIGURE 1 is an exploded perspective view of a pipe, a welding sleeve, a pipe fitting and a pressure application means, the four of which are used to form a thermally welded pipe joint in accordance with this invention.

FIGURE 2 is a quarter section in elevation of a thermoplastic pipe fitting formed in accordance with the method of this invention.

DESCRIPTION OF THE INVENTION

The substance of this invention is best illustrated by the formation of an interlocked welded connection between a thermoplastic pipe and a thermoplastic pipe fitting, although it is not to be considered as being restricted to articles of such configuration. As shown in FIGURE 1, the components of the pipe joint are pipe 10, welding sleeve 11, fitting 12, and a pressure applying means, clamp 13. Welding sleeve 11 consists of a wire core embedded in a thin layer of thermoplastic resin with a pair of leads 19 exposed, and is most advantageously constructed by winding a strand of wire covered by thermoplastic material into a core and then fusing the strands together, as recited in copending U.S. application Ser. No. 535,555, Insulated Electrical Resistance Wire and Welding Sleeve Made Therefrom, of Mar. 18, 1966. In a preferred construction, the clamp means 13 comprises a threaded T-handle 14 and associated quick-release fastener 15 so that it can be opened for easy attachment and removal while still retaining the adjustable pressure feature. The fitting 12 and the interlocking of the fitting with welding sleeve 11 and the tube end 10 can be of the type recited in copending U.S. application Ser. No. 536,057, Pipe Fitting, filed Mar. 21, 1966. By this construction there is a deep bore 17 having an inside diameter approximately equal to the outside diameter of pipe 10 and a shallow bore 18 having an inside diameter approximately equal to the outside diameter of welding sleeve 11. This allows the sleeve 11, pipe 10, and fitting 12 to interlock as shown in FIGURE 2.

The first step in the instant method is to install the two thermoplastic articles to be welded in the proper relative positions with the welding sleeve interposed between. In the case of the tubular pipe fitting illustrated in FIGURE 2, pipe 10 is inserted into the deep bore 17 of fitting 12 and welding sleeve 11 positioned in shallow bore 18 such that it is interposed between the tube and the fitting with the exposed electrical connections 19 extending outwardly. Clamp 13 is then installed about fitting 12 in a position directly over the portion to be welded. By means of the T-handle adjusting means 14, 15 clamp 13 is tightened about the assembled pipe, fitting and sleeve such that an inward pressure is exerted about the entire periphery of the joint. This peripheral pressure forces the elements of the joint into close contact, thus expelling any air that has become entrapped and promoting optimum heat transfer for good fusion depth and a strong bond. Once clamp 13 has been properly tigtened, an electrical power unit, not shown, is connected to the exposed leads 19 of welding sleeve 11 and the power is applied. Electrical heating of the coils in sleeve 11 melts the thermoplastic material in coil 11, and also melts a surface layer of material adjacent thereto in fitting 12 and tube 10 so that the articles are fused together. The thermal expansion which takes place is in the outward direction and since clamp 13 has already pressurized the joint, the force of expansion is actually harnessed to supplement the pressure being applied by the clamp ring.

It is advantageous to apply additional peripheral pressure to the joint approximately half-way through the heating cycle by again tightening clamp 13. This is desirable since any minute air bubbles which may survive the initial application of pressure will expand upon the application of heat and could possibly ruin the joint. In addition, this second application of pressure provides a method of compensating for improper sizing between pipe 10 and fitting 12. For example, if the outside diameter of tube 10 were undersized, the possibility of a poor joint would be substantially increased because of the lack of intimate contact and the presence of entrapped air. However, as the articles are heated they will soften in the area of the joint and are then deformable. Therefore, a second application of peripheral pressure after a portion of the welding cycle will result in fitting 12 being deformed inwardly to contact an undersized pipe 10.

In an alternative method of construction of the joint, sleeve 11 can be molded to one of the articles to be welded, for example, around the exterior of pipe 10 or disposed around the interior of fitting 12, in bore 18. The only difference presented here is that there is no separate welding sleeve 11; when pipe 10 and fitting 12 are interlocked, sleeve 11 will be properly interposed therebetween.

When a welding technique such as that herein described is used in a very cold environment, the application of the same amount of heat as would be used in warmer temperatures results in only a very thin layer of material adjacent welding sleeve 11 being melted, and thus the fusion depth is insufficient and a poor bond results. Although the obvious solution to this problem might seem to be simply to apply more heat, this may cause the surface material to bubble rather than providing greater fusion depth, because of the poor heat conduction due to the cold. However, the key to solving this problem is the application of additional peripheral pressure to the joint approximately halfway through the heating cycle as described above. Such action causes renewed intimacy of contact between the articles and thus promotes deeper fusion depth.

It is thus seen that this invention offers a substantial improvement to the methods set forth in the prior art. It overcomes major problems present in this field without materially changing the structure of the prior art devices or unduly complicating the processes set forth therein. Although the method has been illustrated by the use of tubular pipe fitting and an encircling clamp, the invention is not limited to such an embodiment, but can be equally well used with articles of other configurations by designing the clamp means to cooperate therewith.

Obviously, many modifications and variations of the present invention are possible in the light of the above teachings. It is therefore, to be understood that within the scope of the appended claims, the invention may be practiced otherwise than as specifically described.

I claim:
1. In the process for welding together two shaped articles of thermoplastic material wherein the articles are interlocked with a welding sleeve positioned therebetween, the welding sleeve comprising a heating conductor enclosed in a layer of thermoplastic material, the improvement comprising the steps of:
   (a) electrically heating said heating conductor to melt the thermoplastic material of said welding sleeve and said shaped articles adjacent thereto,
   (b) applying pressure externally to said heated articles to squeeze said articles and said sleeve together to insure intimate contact therebetween during the melting of said thermoplastic material, and
   (c) continuing said heating step until the thermoplastic material of said welding sleeve and said shaped articles adjacent thereto has sufficiently melted to weld said interlocked articles together.

2. The process of claim 1 wherein the welding sleeve is joined to one of the articles before it is interlocked with the other of the articles.

3. A process of forming a lap joint between tubular articles of thermoplastic material, comprising the steps of:
   (a) interlocking the tubular articles in lapped relationship with a welding sleeve positioned radially therebetween, said welding sleeve comprising a heating conductor enclosed in a layer of thermoplastic material,
   (b) positioning annular clamping means on the outer surface of the portion of the article surrounding the welding sleeve and the other article,
   (c) electrically heating said heating conductor to melt the thermoplastic material of said welding sleeve and the adjacent portions of said articles,
   (d) tightening said clamping means to apply pressure to the lapped portions of said heated articles to squeeze said articles and said sleeve together to insure intimate contact therebetween during the melting of said thermoplastic material, and (e) continuing said heating step until the thermoplastic material of said welding sleeve and the adjacent portions of said articles has sufficiently melted to weld the interlocked articles together.

4. The process of claim 3 wherein the welding sleeve is joined to one of the articles before it is interlocked with the other of the articles.

References Cited

UNITED STATES PATENTS

| | | | |
|---|---|---|---|
| 2,930,634 | 3/1960 | Merritt | 156—275 X |
| 3,049,465 | 8/1962 | Wilkins | 156—275 |
| 3,051,509 | 8/1962 | Wilton et al. | 156—275 X |
| 3,062,940 | 11/1962 | Bauer et al. | 156—275 X |
| 3,061,503 | 10/1962 | Gould et al. | 156—275 |
| 3,094,452 | 6/1963 | Von Riegen et al. | 156—275 |
| 3,133,846 | 5/1964 | Gandy | 156—275 X |
| 3,207,642 | 9/1965 | Lucich | 156—275 X |
| 3,378,672 | 4/1968 | Blumenkranz | 156—275 X |

BENJAMIN R. PADGETT, Primary Examiner

S. J. LECHERT Jr., Assistant Examiner

U.S. Cl. X.R.

156—293, 306